Dec. 2, 1958 W. A. STAATS 2,862,478
FLUID MOTOR PISTON
Filed June 11, 1956 2 Sheets-Sheet 1

INVENTOR.
WILLIAM A. STAATS
BY Toulmin & Toulmin
Attorneys

INVENTOR.
WILLIAM A. STAATS
BY Taulmin & Taulmin
Attorneys

United States Patent Office 2,862,478
Patented Dec. 2, 1958

2,862,478

FLUID MOTOR PISTON

William A. Staats, Ashland, Ohio, assignor to The F. E. Myers and Bro. Company, Ashland, Ohio, a corporation of Ohio Application June 11, 1956, Serial No. 590,533

1 Claim. (Cl. 121—123)

This invention relates to a fluid motor and, in particular, a hydraulically operated fluid motor having a valved piston and employed as a chemical feed pump.

In many instances, it is desirable to add chemicals to a water stream for the purpose of controlling chemical characteristics of the water stream, or for obtaining a certain reaction between the water stream and articles with which it comes in contact, or to provide the water with certain therapeutic or disease preventive properties.

For example, water may be treated by having chlorine added thereto in order to purify it, or may have a medication or vaccine, particularly for poultry or livestock, added thereto as it is delivered to the point of use.

In other cases, as with a submersible pump, particularly one which is supplied by a jet, or one which is located in a well casing to which a chemical can be added, a material such as a polyphosphate solution can be supplied to the pump inlet, and this will substantially eliminate the problem of iron plugging of the pump.

This same substance, namely, polyphosphate, is useful in connection with providing for rust prevention of hot water tanks, although a form of sodium silicate is more effective and can be utilized if supplied to the water in a carefully measured manner.

In many localities, particularly where there are many chemical industries, it is essential to effect a pH control of the water, and this can be done relatively accurately by supplying chemical in measured amounts to the water strength.

Similarly, fertilizers, wetting agents, fungicides, tracer elements, disinfectants, and deodorants all are supplied to water for various purposes. Heretofore, the supplying of addition agents of the nature referred to above to water streams has been a difficult and expensive proposition, because of the complexity and expense of pumps or feed devices for supplying the agents, and also because of the difficulty of regulating the devices to provide for accurate rate of supply of the addition agent.

It is therefore the principal object of this invention to provide a motor arrangement, including an automatic reciprocating piston, by means of which power can be extracted from a moving stream of liquid for performing a work operation such as the addition of a chemical to the water stream from which the power is taken.

It is an additional object of this invention to provide a power generating apparatus for being associated with a stream of moving liquid which requires no electric power for its operation, but instead derives its power from the liquid.

It is also an object of this invention to provide an arrangement for extracting power from a moving liquid stream which will operate on a small pressure differential.

A particular object of this invention is the provision of a simple control valve mechanism which is entirely automatic in operation.

Another object of this invention is the provision of an arrangement for amplifying a small pressure differential into a high working pressure on a smaller body of fluid.

A still further particular object of the present invention is the provision of an improved check valve arrangement for chemical pumps and the like which facilitates the accessibility thereof for cleaning.

A still further object of this invention is the provision of a chemical feed pump for supplying an addition agent to a water stream which will not operate unless water is flowing in the stream, thereby eliminating the possibility of feeding raw chemicals into the water lines.

These and other objects and advantages of this invention will become more apparent upon reference to the following specification taken in connection with the accompanying drawings, wherein.

Figure 1:
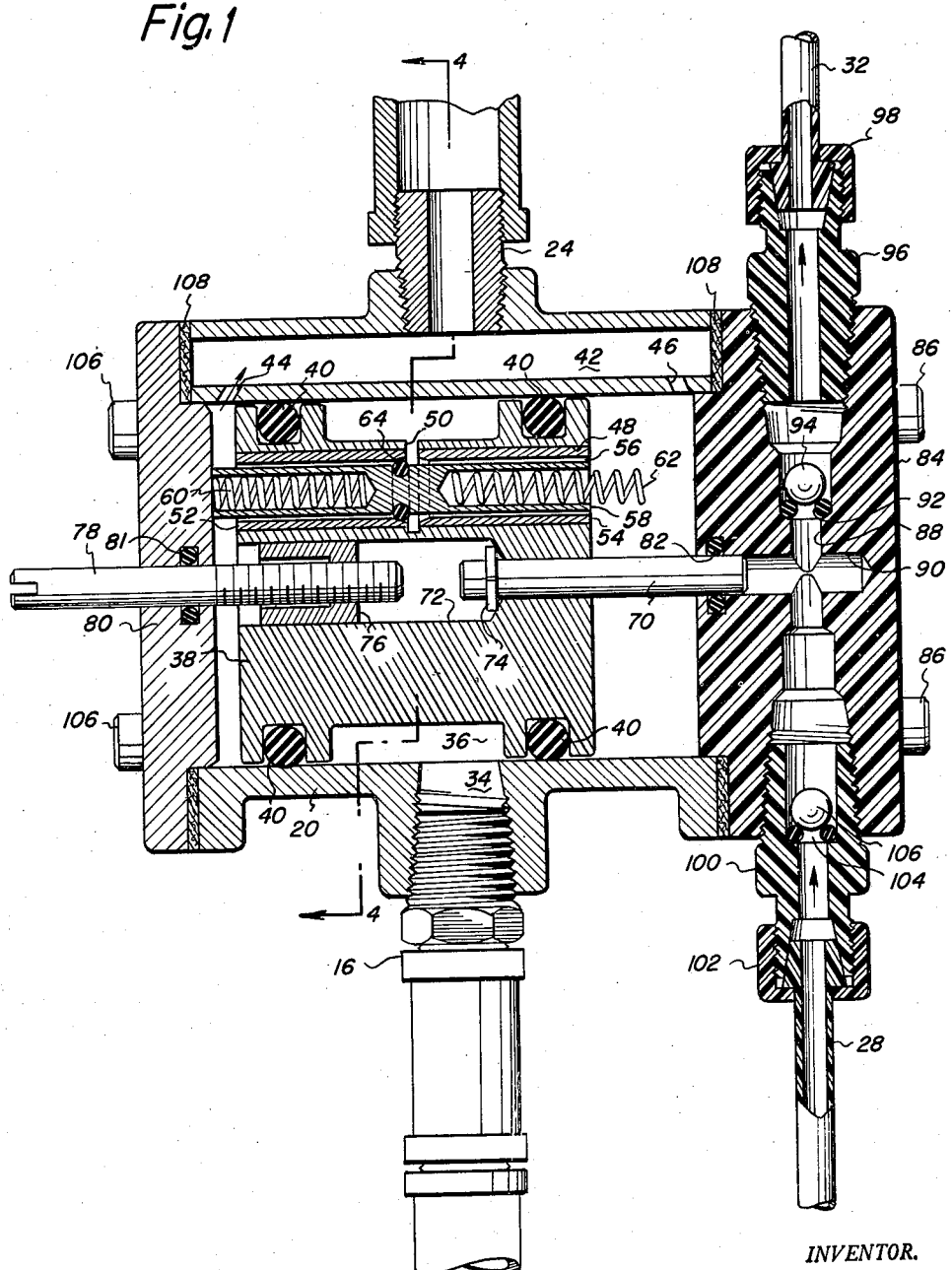
Figure 1 is a vertical cross section through the power generating device and the chemical feed pump associated therewith, and is indicated by the cutting plane 2—2—2 on Figure 1.
Figure 2:
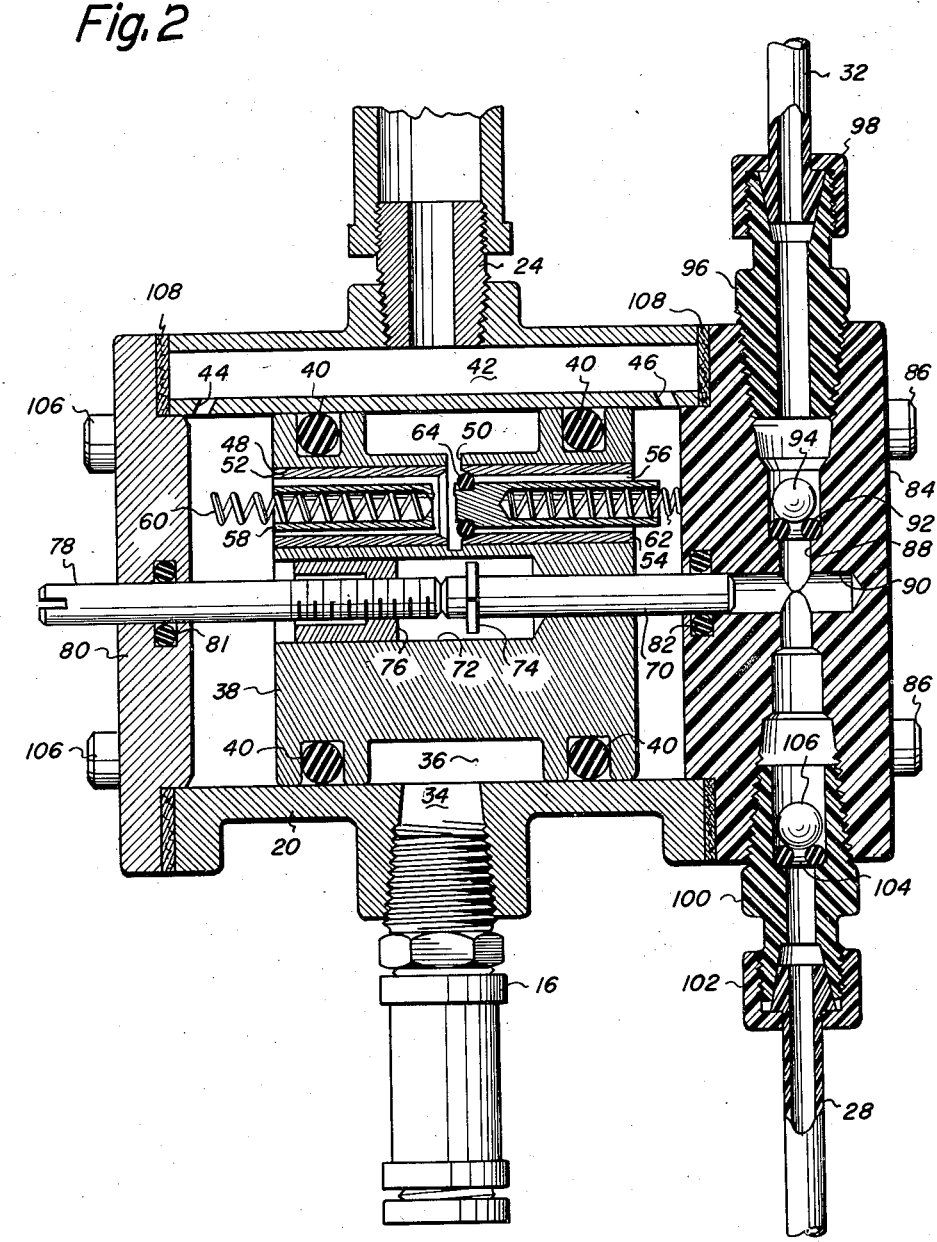
Figure 2 is a view, like Figure 2, but shows the parts of the device moving in the opposite direction.

The construction of the power piston and pump arrangement will be best seen upon reference to Figures 1 and 2. In these figures, it will be noted that conduit 16 opens through port 34 into the interior of cylinder 20 into annular space 36 between spaced lands of a reciprocating piston 38. Each land has a rubber-like O ring 40 therein, which effects an effective fluid seal between each land and the wall of the cylinder.

The cylinder 20 on the side thereof opposite port 34 has a raised portion within which there is a longitudinal passage 42 communicating at its opposite ends via ports 44 and 46 with the opposite ends of cylinder 20, and also communicating in the region of the center with conduit 24.

The power piston 38 is provided with a bore therethrough at 48, and which is intersected in about the center of the power piston by a traverse milling cutter or saw slot 50. Also mounted in bore 48 are the sleeves 52 and 54, the inner ends of which coincide with the side edges of slot 50, and the outer ends of which are flush with the ends of the power piston.

Loosely mounted within sleeves 52 and 54 so as to have a clearance therebetween as at 56 is a valve plunger or rod 58. The opposite ends of plunger or rod 58 are bored for receiving the compression springs 60 and 62, which normally project out beyond the ends of valve rod 58.

The valve rod has an annular groove formed thereabout in the center which receives a resilient rubber-like O ring 64 which is adapted for sealingly entering the flared inner ends of the sleeves 52 and 54 as the valve rod reciprocates therein.

It will be apparent that when the valve rod is in its Figure 1 position, pressure will pass from port 34 into annular space 36, thence into slot 50 and out the right end of sleeve 54 pressing power piston 38 leftwardly. When the piston has moved leftwardly to the point where spring 60 will snap the valve rod rightwardly, then the pressure fluid will commence to flow out the left end of sleeve 52 and force the power piston 38 rightwardly until the valve rod is moved back to its Figure 1 position. During this rightward movement of the power piston, the valve rod is in its Figure 2 position.

The above-described reciprocation of the power piston is availed of for reciprocating a pump plunger 70 whose left end extends into a cavity 72 in the center of the power piston where it carries a collar or snap ring 74. Pressure-fitted into cavity 72 is a threaded plug 76 into which is threaded the abutment screw 78 that extends leftwardly through cover 80 and sealing ring 81.

It will be apparent that screw 78 can be adjusted either to clamp the collar 74 against the bottom of recess 72, whereupon plunger 70 will move with piston 38; or, screw 78 can be backed off as shown, thereby providing for a predetermined amount of lost motion between piston 38 and plunger 70, which will permit the said plunger to take a shorter working stroke than the stroke of the power piston.

Plunger 70 extends through O ring seal 82 into a block 84 which is preferably of a material substantially inert to all of the chemical materials which the pump will be handling, and which is secured to the right end of cylinder 20 as by the cap screws 86, thereby serving as a right-end cover member.

The block 84 has a vertical bore 88 therein intersecting the bore 90 in which plunger 70 works. Bore 88 at its upper end has a counter bore portion in which rests a valve seat 92 that receives the check valve ball 94. The upper end of bore 88 is drilled and threaded to receive the fitting 96, which is connected at its upper end by means of nut 98 with the previously mentioned tube 32.

At its lower end, bore 88 is bored and threaded to receive a fitting 100 to which is attached by nut 102 the end of suction tube 28. Fitting 100 differs from fitting 96 in that fitting 100 is counterbored to receive a seat member 104 on which the check valve ball 106 fits.

It will be apparent that the entire structure of the pump section could be made of material that would resist corrosion by substantially any chemical material being handled, so that the pump unit would operate for an indefinite period without requiring any service whatsoever on account of corrosive influences of the materials being handled.

The cover 80 at the left end of cylinder 20 is retained thereon by cap screws 106 and gasket means 108 are provided at both ends of cylinder 20 to provide a suitable seal between the covers and the cylinder.

It will be apparent from the foregoing that as the power piston 38 reciprocates, the chemical pump plunger 70 will reciprocate within its bore 90, and draw chemical upwardly through tube 28 passing the check valve in fitting 100, and force this chemical outwardly through the check valve above bore 90 and thence into tube 32.

In this manner, an amount of chemical is supplied to the water stream which is exactly proportional to the amount of water flowing through the main stream.

An adjustment of the chemical dispersed can be effected by adjusting the abutment screw 78. In this manner, the arrangement is capable of being adjusted to widely varying flow conditions, and for widely varying amounts of chemical to be dispensed.

It will be apparent from the foregoing that the present invention provides a ready and inexpensive means for supplying chemical in precisely measured amounts to a liquid stream, and in a simple and inexpensive manner. The power piston portion of the device is applicable to other services than driving the chemical pump illustrated, but the chemical pump is shown because this represents one of the best usages which is contemplated for the device.

It will be understood that this invention is susceptible to modification in order to adapt it to different usages and conditions, and, accordingly, it is desired to comprehend such modifications within this invention as may fall within the scope of the appended claim.

I claim:

In a fluid power device; a cylinder, a spool type piston in the cylinder, an inlet in the cylinder opening into the space between the heads of the piston, restricted outlets leading from the opposite ends of the cylinder, a bore through the piston from end to end thereof, there being an opening providing communication from said bore to between the heads of the piston, a valve member in said bore having a substantial clearance inside the bore to provide for the passage of fluid along the bore, a valve seat on said valve member for sealingly engaging said opening to provide communication from either end of said piston to between the heads thereof, said valve member being bored from its opposite ends, a compression spring in each bore of the valve member extending outwardly beyond the end of the piston, a source of pressure fluid connected with said inlet, and an exhaust conduit leading from said outlets, said compression springs providing means for snap shifting said valve member as the piston approaches opposite limits of its travel in the cylinder.

References Cited in the file of this patent

UNITED STATES PATENTS

| | | |
|---|---|---|
| Re. 12,719 | Coffield | Nov. 12, 1907 |
| 257,280 | Blessing | May 2, 1882 |
| 529,581 | Barnett | Nov. 20, 1894 |
| 1,142,551 | Burnhart | June 8, 1915 |
| 1,578,199 | Matz | Mar. 23, 1926 |
| 2,096,733 | Corydon | Oct. 26, 1937 |
| 2,148,671 | Allen | Feb. 28, 1939 |
| 2,192,325 | Nelson | Mar. 5, 1940 |
| 2,252,939 | McCoy | Aug. 19, 1941 |
| 2,413,029 | McFarland | Dec. 24, 1946 |
| 2,445,540 | Smillie | July 20, 1948 |
| 2,814,252 | Volk | Nov. 26, 1957 |

FOREIGN PATENTS

| | | |
|---|---|---|
| 289,758 | Germany | Jan. 17, 1916 |
| 488,045 | Italy | Dec. 14, 1953 |